UNITED STATES PATENT OFFICE.

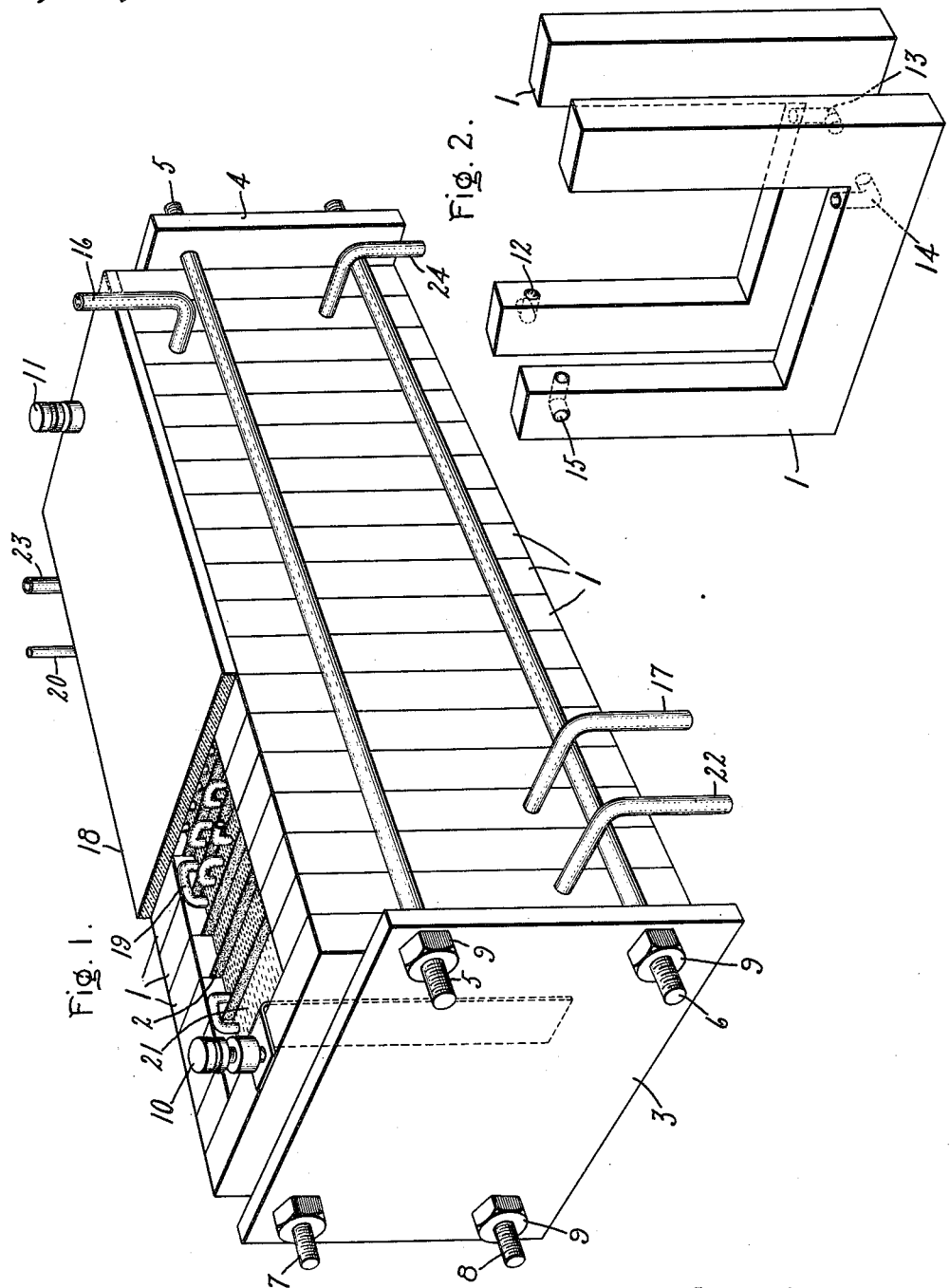

WILLIS R. WHITNEY, OF SCHENECTADY, NEW YORK, ASSIGNOR TO GENERAL ELECTRIC COMPANY, A CORPORATION OF NEW YORK.

CONCENTRATION OF SOLIDS IN LIQUIDS.

1,022,523.  Specification of Letters Patent.  Patented Apr. 9, 1912.

Application filed April 2, 1910. Serial No. 553,012.

*To all whom it may concern:*

Be it known that I, WILLIS R. WHITNEY, a citizen of the United States, residing at Schenectady, county of Schenectady, State of New York, have invented certain new and useful Improvements in Concentration of Solids in Liquids, of which the following is a specification.

My invention relates to the removal of solid matter from a liquid, the solid matter being in the form of a colloid or a mechanical suspension.

One important application of my process is the removal of organic solid matter, such as casein and cream, from milk.

According to my invention, the liquid containing the suspended matter is introduced into an apparatus containing one or more partitions or diaphragms permeable with respect to the liquid but not to the solids to be separated. The solids are then migrated electrically in a direction at right angles to said partitions and are thereby deposited upon one side of said partitions. Preferably the liquid is renewed continuously, as by flow from one compartment to the next through a suitable by-pass. When the solid precipitate is decomposable or fermentable, as is the case with milk solids, a disinfectant is migrated into the same after precipitation, thereby destroying bacterial life. The disinfectant is then migrated out, and is followed by pure water, leaving the solid in a readily preservable condition.

My invention also comprises an apparatus for carrying out the above process.

In the accompanying drawings Figure 1 illustrates a typical cell for carrying out the migration process and Fig. 2 is a detailed view showing in perspective two frames for supporting the diaphragms.

The apparatus illustrated is merely shown as one form of apparatus suitable for carrying out the invention, and the invention is not limited in application to this particular type of apparatus. The apparatus comprises a number of wooden blocks 1, between which the diaphragms, or membranes, 2 are supported. The wooden frame work is firmly held together by being clamped between end plates 3, 4 tied together by the horizontal rods 5, 6, 7, 8 passing through said end plates and secured at each end by nuts 9 as clearly shown.

Electrodes 10, 11 dip respectively into each of the end compartments, electrode 10 only being shown for the purpose of illustration. When the solids are to be removed from a liquid such as milk, these electrodes preferably consist of platinum.

A series of by-passes 12, 13, 14, 15 shown in Fig. 2 allow the liquid to pass from one compartment to the next and so on through the cell. The liquid passing, for example, from one compartment into the by-pass 12 into the top of the adjoining compartment, and then passing from this compartment through by-passes 13 and 14 into the bottom of the next compartment. The liquid leaves the top of this compartment by the by-pass 15 which in turn communicates with a by-pass in another frame. The milk, or other liquid enters the cell by tube 16 and passes in the above manner through the compartments in section and the spent liquid leaves by means of tube 17 after the solids have been removed. The number of compartments will vary with the character of the liquid, the voltage impressed at the terminals, and similar conditions.

The migration of the solids, in other words, the travel of the solids toward one of the poles appears to involve an electrical action as though each of the particles possessed a static charge. When an electromotive force is impressed upon the liquid the particles travel toward one of the poles where the charge is apparently neutralized. The amount of current actually utilized is extremely small, in some cases too minute to be measured. As a liquid such as milk, however, contains more or less dissolved matter, it possesses considerable conductivity. More current, therefore, actually passes through the liquid than is needed to migrate the solids. This current produces a certain amount of undesirable electrolysis at each electrode, acids being evolved at the positive pole and alkali at the negative pole. If, therefore, the electrodes dip directly into the milk a certain amount of acid or alkali will be carried along through the various compartments depending upon the direction of flow of the milk. In order to avoid this undesirable result, each of the end compartments containing electrodes are filled with water thereby providing "water electrodes." The resistance of water being high, this expedient raises the total resistance of the cell and thereby cuts down the current. As a certain amount of electrolysis takes place even when the electrode is in contact with water due to small quantities of dissolved salts, the water in these end compartments is continually renewed. By this means the concentration of acid and alkali in the anode and cathode compartments, respectively, is kept so low that the diffusion of acid and alkali into the milk takes place only in negligibly small amounts, or not at all.

When a voltage as high as 250 volts is impressed upon the cell the current is still large enough even under the above conditions to produce considerable heating. As indicated in the drawing where the cover 18 has been partly removed a cooling coil 19 passes through the compartments in zigzag form passing from one compartment to the next. The water enters the cooling coil by means of tube 20 passes in turn through the various compartments and finally empties into the end compartment serving to renew the water in this compartment for the reasons above given. It finally leaves the end compartment 21 by means of tube 22. The water is renewed in the compartment at the other end of the cell by means of tubes 23 and 24.

The diaphragms are stretched between the frames 1 when the cell is set up. They consist of some material which is permeable under the migrating influence of the current to liquid, but not to the solid component of the milk. For this purpose cloths may be used in the fibers of which a compound of gelatin and formaldehyde has been precipitated. The diaphragms may be prepared by immersing the cloth in a concentrated solution of clear white gelatin while the latter is nearly boiling hot. Upon removal of the cloths from the gelatin solution the excess of gelatin is squeezed out, the cloths are partially dried and they are then immersed in a 35 to 40% solution of formaldehyde for about one-half hour. They are finally washed in a running water and kept in a moist state until used. Cloths soaked in collodion solution and then partially dried may likewise be used. In general diaphragms are used through which the solid particles will not migrate under the influence of the current. In some cases a mineral diaphragm such as unglazed porcelain may be desirable.

When the solids are removed from milk, a slow circulation, or flow, of the milk from the anode toward the cathode is produced.

The rate of flow and the voltage impressed upon the cell will vary according to the character of the liquid in the amount of solids to be removed therefrom. As a specific example, I may say that with a cell provided with a cooling coil as above described, the solids from two liters of milk were removed under the following conditions, the run lasting four hours: The voltage remained in the neighborhood of 254 volts, the average current being 1.37 amperes. The average temperature was 21.5° C. 62 g. of casein and cream were precipitated on the membranes representing nearly all of the total solids in the milk. When the cooling coil is omitted, it is well to reduce the voltage somewhat, thereby also lengthening the total time required to migrate out the solids. Under these conditions 56.5 g. of casein were removed from 1.631 kilograms of pure skimmed milk in $5\frac{1}{2}$ hours. The voltage averaged about 136 volts with a current of about .35 amperes. The solids travel from the anode toward the cathode end of the cell, and are deposited upon the diaphragms.

At the end of the run the liquid is drawn off, and the precipitated solid matter is removed from the diaphragms. If it is desired to preserve the solid matter, such as the casein of the milk which under ordinary conditions would ferment, a germicide or disinfectant such as formaldehyde or sulfurous acid is first migrated through the cell, thereby destroying all the bacterial life in the precipitate solids. This is done by simply introducing the disinfectant in the cathode compartment and continuing the flow of current through the cell until the disinfectant solution has penetrated through the anode compartment. The disinfectant solution is then replaced by pure water and the migration is continued until all of the disinfectant is again migrated out of the precipitated solids which are then in condition to keep unaltered as long as new infection is prevented.

While I have explained my invention with reference to the removal of milk solids, I wish it to be understood that it is not limited in its application to this particular purpose. The process can be used, for example, for the purification of drinking water. In this case, the special "water electrodes," separate from the rest of the cell, will not be required. The water to be purified can be circulated through the electrode compartments as the small amounts of alkali and acid produced at the electrodes will be mingled in the water and will neutralize each other and in any event will do no harm.

What I claim as new and desire to secure by Letters Patent of the United States is:

1. The process which consists in impressing an electromotive force upon a liquid containing suspended organic solid material, while said liquid is in contact with a diaphragm impermeable with respect to said solids, thereby migrating said solids toward and precipitating the same upon said diaphragm, introducing a disinfectant into contact with said organic material and removing said disinfectant by electrical migration.

2. The combination of a container, a plurality of partitions dividing said container into compartments, electrodes immersed in substantially pure water in each of the end compartments, means for renewing said water, means for maintaining a flow of liquid containing suspended solid matter through each of the other compartments and means for cooling the liquid in said container.

3. In an electrical migration apparatus, a container, permeable partitions separating said container into sections to form a plurality of chambers, means for maintaining a flow of substantially pure water through the end chambers, and electrodes for said chambers.

4. The process of preserving milk solids collected upon a diaphragm permeable with respect to liquids, but impermeable with respect to the milk solids which consists in electrically migrating a disinfectant through said milk solids, thereby destroying bacterial life.

5. The process of preserving an organic solid material collected upon a diaphragm permeable with respect to said liquid but impermeable with respect to said solid which consists in introducing a disinfectant into contact with said organic material and finally removing said disinfectant by electrical migration.

6. The process which consists in impressing an electromotive force upon milk while in contact with a diaphragm interposed between the electrical poles thereby migrating the milk solids and collecting the same upon said diaphragm, introducing a disinfectant into the liquid residue, continuing the electrical migration to introduce the disinfectant into the milk solids and finally replacing the liquids in contact with the milk solids by pure water while continuing the migration, thereby removing said disinfectant.

7. In an electrical migration apparatus, a container, permeable partitions separating said container into a plurality of chambers, one of which contains suspended solid matter, means for maintaining a flow of substantially pure water through chambers situated outside of said chamber, and electrodes for said water-containing chambers.

In witness whereof, I have hereunto set my hand this 1st day of April, 1910.

WILLIS R. WHITNEY.

Witnesses:
 BENJAMIN B. HULL,
 HELEN ORFORD.